No. 642,290. Patented Jan. 30, 1900.
J. M. BLACK.
MACHINE FOR CUTTING CARDBOARD.
(Application filed July 21, 1899.)
(No Model.) 4 Sheets—Sheet 1.

Witnesses. Inventor.

No. 642,290. Patented Jan. 30, 1900.
J. M. BLACK.
MACHINE FOR CUTTING CARDBOARD.
(Application filed July 21, 1899.)
(No Model.) 4 Sheets—Sheet 2.

Witnesses. Inventor.

No. 642,290. Patented Jan. 30, 1900.
J. M. BLACK.
MACHINE FOR CUTTING CARDBOARD.
(Application filed July 21, 1899.)
(No Model.) 4 Sheets—Sheet 3.

Witnesses. Inventor.
J. D. Kingsbury John M. Black
B. W. Brockett By Whitaker & Prevost Attys No. 642,290. Patented Jan. 30, 1900.
J. M. BLACK.
MACHINE FOR CUTTING CARDBOARD.
(Application filed July 21, 1899.)
(No Model.) 4 Sheets—Sheet 4.

Witnesses
J. D. Kingsbury

Inventor
John M. Black
By Whitaker Prevost attys.

UNITED STATES PATENT OFFICE.

JOHN MELTON BLACK, OF LONDON, ENGLAND.

MACHINE FOR CUTTING CARDBOARD.

SPECIFICATION forming part of Letters Patent No. 642,290, dated January 30, 1900.

Application filed July 21, 1899. Serial No. 724,645. (No model.)

*To all whom it may concern:*

Be it known that I, JOHN MELTON BLACK, a subject of the Queen of Great Britain, residing at London, England, have invented new and useful Improvements in Rotary Machines for Cutting Cardboard and the Like, of which the following is a specification.

My invention relates to rotary machines for cutting cardboard into tickets and to that class of such machine wherein strips of cardboard (previously cut to the width of the tickets to be made) are divided into lengths, the object of my invention being to provide improved means for collecting the cut pieces, so that when the latter are printed and numbered they shall be in consecutive order.

In carrying out my invention I combine with a machine having upper and lower sets of rotary shears arranged in the usual manner a hopper, in which the strips of cardboard to be cut are placed so as to lie parallel with the shafts and the shears and within a few inches of the same, the said hopper being made of the length of the strips of cardboard to be separated and of any convenient height. In conjunction with this hopper I arrange a plunger designed to push out the lowermost strip from the hopper and move it toward the shears. In connection with the shears I arrange guides for receiving the cut pieces as they emerge from the shears and carrying the alternate pieces at different levels, the said guides having arranged in connection with them a gathering device for pushing the tickets toward and into a collecting or receiving box and arms or plungers for pushing the tickets downward into the said box. Means are also provided for moving the collecting-box as it gradually fills with tickets.

To enable my invention to be fully understood, I will describe the same by reference to the accompanying drawings, in which—

Figures 1, 7:
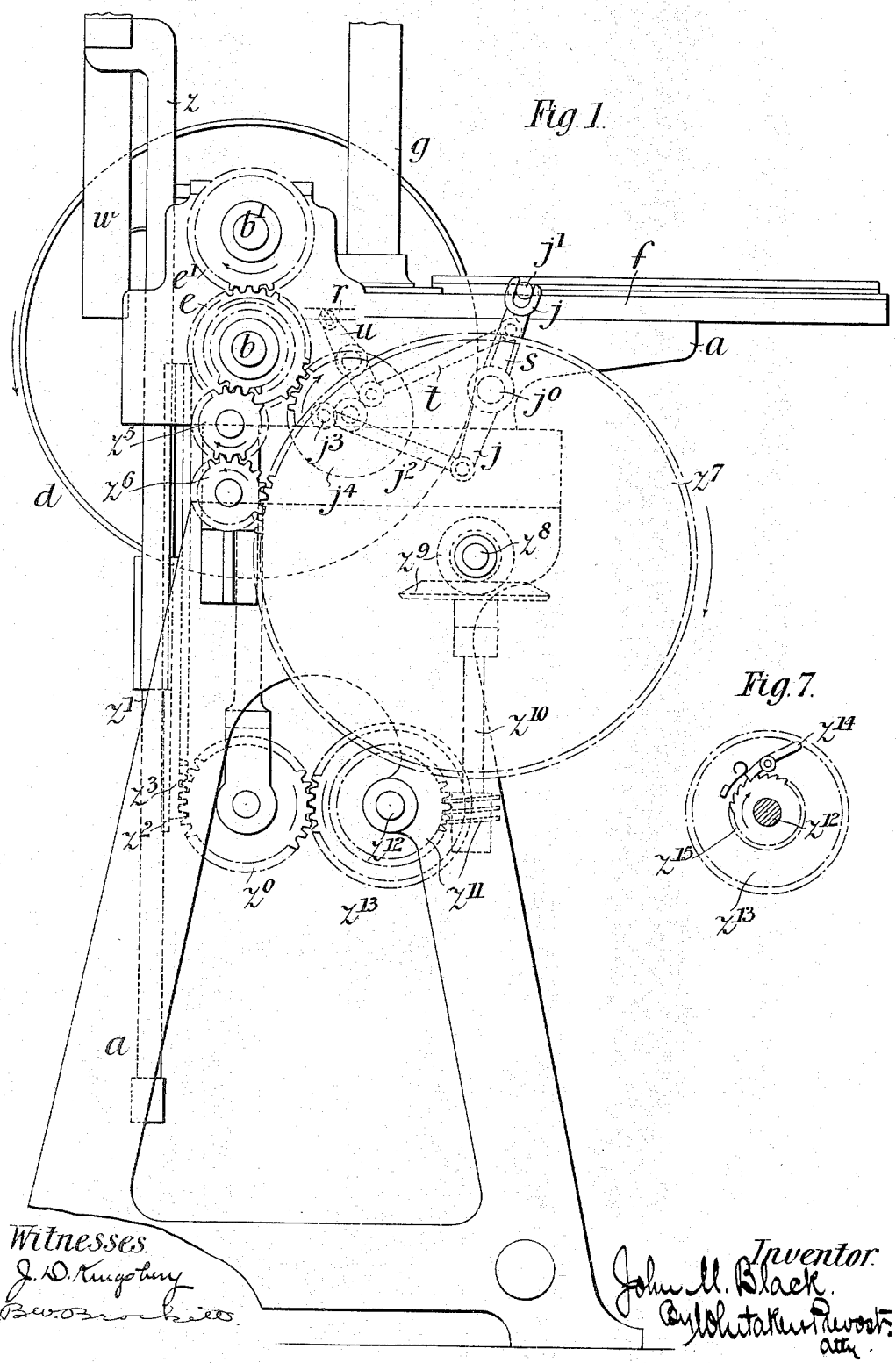
Figure 2:
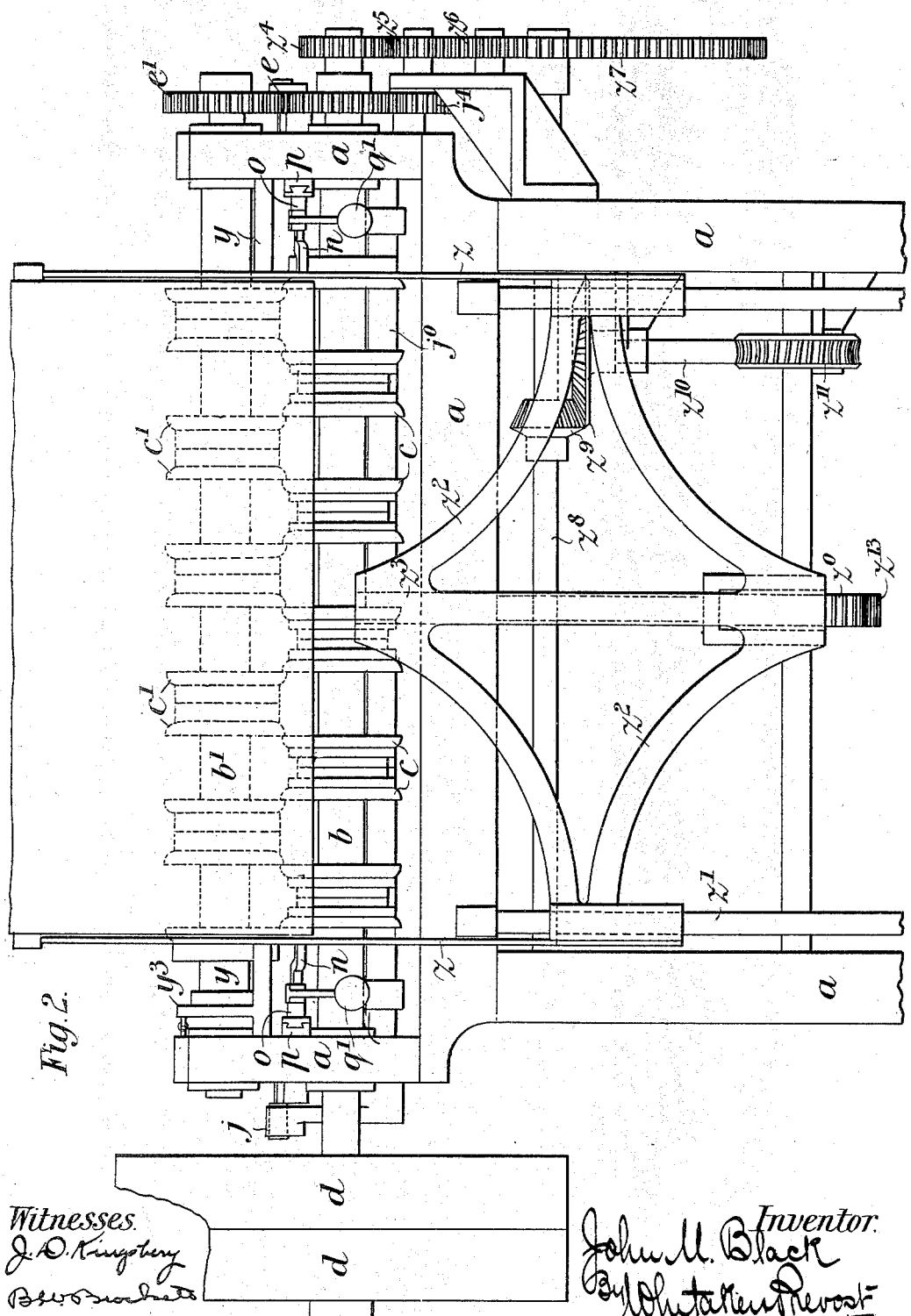
Figure 4:
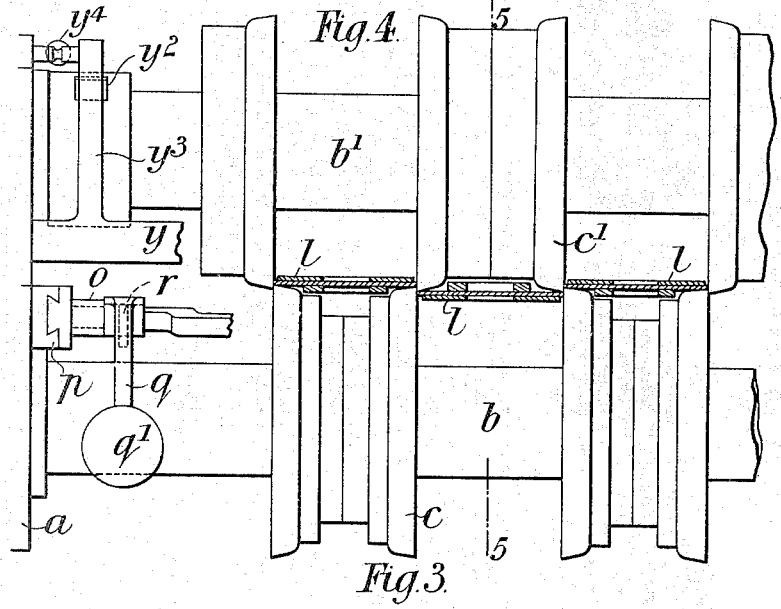
Figure 3:
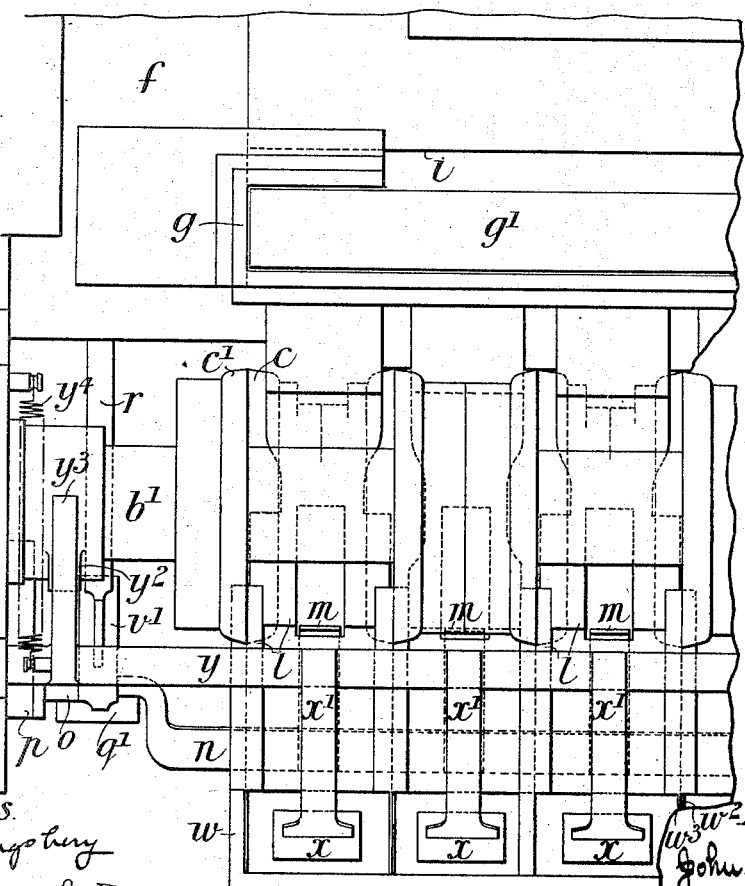
Figure 5:
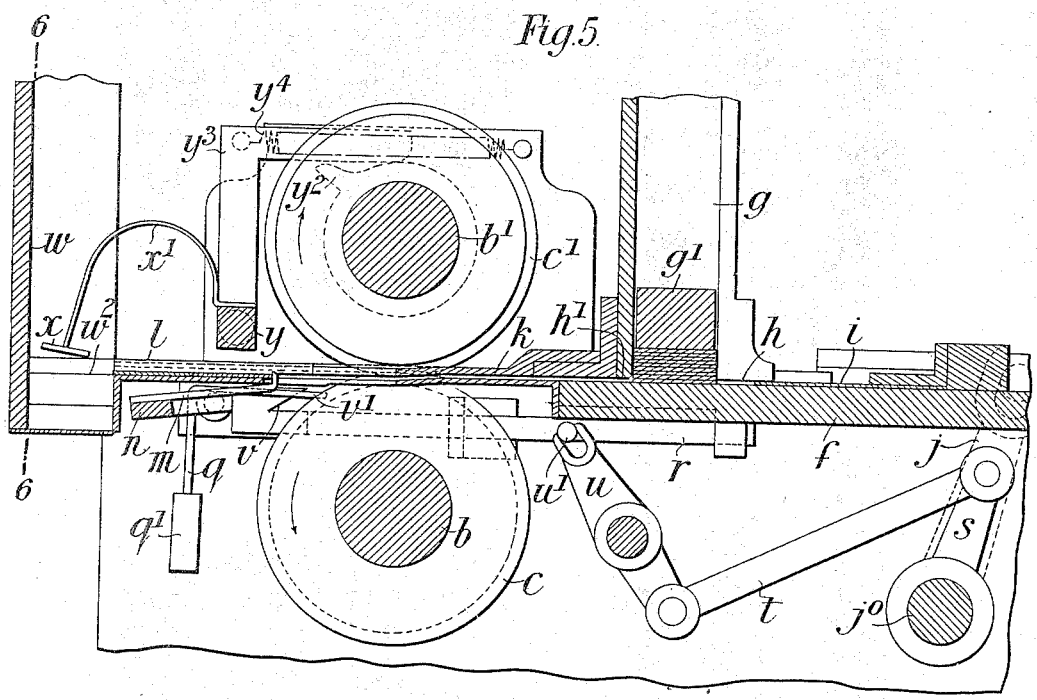
Figure 5A:
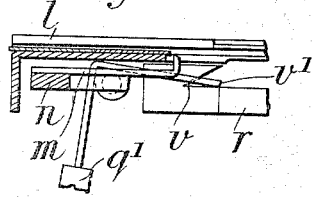
Figure 6:
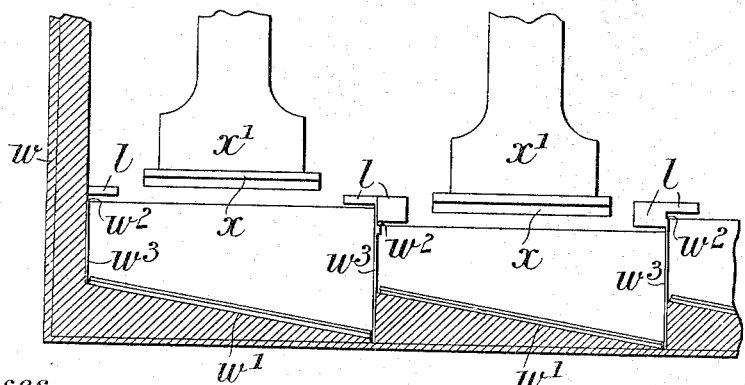

Figure 1 is a side elevation of my improved machine, and Fig. 2 is a rear elevation of the same. Fig. 3 is a plan view of a part of the said machine, drawn to a larger scale than Figs. 1 and 2. Fig. 4 is a sectional elevation of some of the parts shown in Fig. 3. Fig. 5 is a section on the line 5 5 of Fig. 4. Fig. 6 is a section on the line 6 6, Fig. 5, drawn to a larger scale. Fig. 7 is a view of a detail.

$a$ is the frame of the machine, and $b\ b'$ are the shafts, carrying the rotary cutting-disks $c\ c'$, respectively, the said cutting-disks being arranged back to back in pairs in such a manner that the cutting edges of the disks on the lower shaft enter between and work in contact with the cutting edges of the disks upon the upper shaft in a well-known manner, and the pairs of disks upon each shaft being arranged at a distance apart corresponding with the length of the tickets to be cut.

In Figs. 1 and 2 the shaft $b$ is represented as the driving-shaft and is provided with fast and loose pulleys $d\ d$ in the ordinary manner. The motion of this shaft is communicated to the shaft $b'$ through the gear-wheels $e\ e'$.

$f$ is a table on the feed side of the machine, and $g$ is the hopper, which is fixed upon the said table and in which the strips of cardboard to be divided are placed in proper order, a weight $g'$ being placed upon the said strips in order to keep them perfectly flat and to maintain the lowermost strip in close contact with the top of the table $f$.

$h\ h'$ are slits which are formed along the base of the hopper at the front and back of the same, the said slits being of a width only slightly greater than the thickness of the cardboard of the tickets, so as to allow of only one strip at a time being pushed out of the bottom of the hopper. I may, if desired, provide means for adjusting the position of the hopper relatively to the table $f$, so as to permit of varying the depth of the slits to suit cardboard of different thicknesses.

$i$ is a sliding plate or plunger of the same length as the strips, but slightly less in thickness, the said plunger being adapted to be reciprocated upon the table $f$, so that on each forward reciprocation it shall enter the bottom of the hopper through the slit $h$ and force out the lowermost strip from the hopper through the slit $h'$ toward the shears. This plunger $i$ is operated from each end through the medium of an oscillating lever $j$, the said lever being mounted upon a cross-shaft $j^0$, carried in the side frames of the machine, one end of which lever $j$ is bifurcated and engages with a pin $j'$ upon the plunger, while the other end is connected by a rod $j^2$ to a crank-pin $j^3$ on a gear-wheel $j^4$, mounted on an axle or stud upon the framing and engaging, as shown, with the gear-wheel $e$ on the shaft $b$.

In practice the movement imparted to the plunger $i$ is slightly greater than the width of tickets, so that the lowermost strip in the said hopper will be moved quite out of the same and toward the shears. As the plunger is withdrawn backward from beneath the column of strips in the hopper the latter drops, so that at the next advance movement of the plunger the said lowermost strip will be pushed out from the hopper and come in contact with the strip previously pushed out, thereby pressing the first strip forward a distance corresponding to the travel of the plunger, and so on. The strips as they pass from the hopper are held down by guides $k$. As the cutting edges of the pair of shears on one shaft enter between the cutting edges of the pairs of shears on the other shaft, it will be obvious that as the tickets are severed adjacent tickets will lie in different planes, as will be clearly understood by reference to Fig. 4, and I have found by experiment that by keeping the tickets at these varying levels they can be pushed forward without becoming disarranged by contact with each other, which is practically impossible if all the tickets are pushed forward upon a flat table. In order to retain the tickets in these different planes, I arrange in conjunction with each pair of shears a guide $l$, in which the same move as they are moved forward. This forward movement of the tickets to deliver them into the collecting-box is effected by means of a gatherer in connection with each pair of shears, which gatherer engages with the severed tickets and draws them forward the required distance. The several gatherers are in the form of hooks $m$, mounted on a bar $n$, extending across the machine and carried in bearings $o$, the said bearings sliding in guides $p$, Fig. 4, to permit of the bar $n$ being caused to traverse to and fro relatively with the shears in order that after the gatherers have drawn a row of tickets into the collecting-box they may move back to engage with another row of tickets, and so on.

Upon the bar $n$ are fixed arms $q$, carrying weights $q'$, the normal tendency of which weights is to hold the bar $n$ in such a position that the hooks will project behind the tickets, as indicated in Fig. 5. The to-and-fro movement of the bar $n$ is effected through the medium of sliding bars $r\ r$, arranged on each side of the machine and receiving their motion from the shaft $j^0$ through the levers $s$, connecting-rods $t$, and double-armed levers $u$, one end of each of which is bifurcated (see Fig. 5) to engage with a pin $u'$ on the bar $r$.

In order that the gatherers $m\ m$ may be moved below the level of the tickets when being moved back (after having pushed a row of tickets forward) to engage with another row of tickets, I provide the bars $r\ r$ with inclined undercut surfaces $v\ v$, which enter loops or stirrups $v'$, fixed to the shaft $n$ in such a manner that when the bars $r\ r$ are reciprocated forward the said inclined planes $v\ v$ by acting upon the said loops will move the same downward, as indicated in Fig. 5$^\mathrm{a}$. When under the return motion of the rods $r\ r$ the inclined surface $v$ moves away from the end of the loop, the counterweights $q\ q$ cause the shaft to rotate sufficiently to project the ends of the hooks $m$ above the level of the tickets, the continued backward movement of the bars $r\ r$ causing them to impinge against the shaft $n$ and push it backward in the guides $p\ p$, together with the row of tickets engaged by the gatherers. On the forward motion of the bars $r\ r$ the inclined surfaces $v$ again act upon the stirrups to depress the hooks and then draw the shaft or bar $n$ forward, so that the gatherers may engage with another row of tickets.

$w$ is a collecting-box into which the tickets are delivered, the said collecting-box having at the bottom inclined surfaces $w'\ w'$, upon which the tickets severed by the several pairs of cutters are respectively delivered, the object of making the said surfaces inclined being to prevent the tickets from binding at the ends, as would be the case if they were delivered into the box horizontally, the diagonal arrangement of the tickets giving the necessary free space. To insure the tickets falling in this inclined position as they are delivered through the guides $l\ l$, shoulders $w^2\ w^2$ are formed on thin partitions $w^3$, extending into the box $w$, the said shoulders supporting the tickets at one end, while the other end is unsupported.

$x\ x$ are the plungers, which push down the tickets into the collecting-box. These plungers are connected by arms $x'\ x'$ to a shaft $y$, extending across the machine, and oscillatory motion is imparted to this shaft $y$ by a cam projection $y^2$ on the shaft $b'$ of the upper set of shears, the said cam projection at each rotation striking against the cranked arm $y^3$ on the shaft $y$.

$y^4$ is a spring which after the shaft $y$ has been oscillated in one direction by the cam projection $y^2$ will return the said shaft, together with the plungers $x$, to their normal position.

It will be understood that as the plungers $x\ x$ press upon the tickets the latter will fall first at the ends which are not supported by the shoulders $w^2$.

It is necessary that as the tickets drop into the collecting-box the position of the uppermost ticket in the said box should remain practically constant relatively with the plungers $x\ x$. I therefore provide for gradually lowering the box as the filling of the latter proceeds. This may be accomplished by any suitable means. In the drawings I have represented the said box as being carried upon the upper ends of two standards $z\ z$, the lower ends of which are connected to sockets sliding on rods $z'\ z'$. These sockets form part of a frame $z^2$, having upon a central bar a rack $z^3$, engaging with a pinion $z^0$, designed to be operated from the shaft $b$ through the medium of the pinions $z^4$ $z^5$ $z^6$, wheel $z^7$, shaft $z^8$, bevel pinion and wheel $z^9$, shaft $z^{10}$, worm and wheel $z^{11}$, shaft $z^{12}$, and wheel $z^{13}$.

To permit of the frame $z^2$ being quickly raised when placing an empty box upon the standards $z\ z$ after removing a full box, I arrange the wheel $z^{13}$ to be loose upon its shaft $z^{12}$, and I provide it with a pawl $z^{14}$, adapted to engage with a ratchet-wheel $z^{15}$, fixed to the said shaft, the parts being so arranged that under ordinary circumstances during feeding the motion of the shaft $z^{12}$ will be communicated to the wheel $z^{13}$, but that when it is desired to raise the frame $z^2$ the said wheel $z^{13}$ can be turned upon the shaft $z^{12}$, when the pawl $z^{14}$ is disengaged from the ratchet-wheel.

Having now particularly described and ascertained the nature of my said invention and in what manner the same is to be performed, I declare that what I claim is—

1. In a machine for cutting cardboard and the like, the combination with the rotary cutters of guides in different horizontal planes, located in rear of the cutters for receiving the severed pieces, substantially as described.

2. In a machine for cutting cardboard and the like, the combination with a hopper for holding a series of strips to be severed, provided at its bottom with an aperture or recess on two opposite sides, of substantially the same vertical width as the thickness of a single strip, a reciprocating horizontal plunger in line with said slits, adapted to enter the hopper therethrough and expel a single strip at each reciprocation, the rotary cutters, and the guides in rear of the cutters located in different horizontal planes, substantially as described.

3. In a rotary machine for cutting cardboard and the like, the combination with a series of pairs of cutting-shears and means for carrying the cardboard severed thereby in different horizontal planes, of a hopper for receiving the strips of cardboard to be severed, a sliding plunger for pushing out the strips successively from the bottom of the said hopper and delivering them to the shears, a gatherer adapted to engage with the tickets as they pass from between the shears and to convey them to a collecting-box and a series of plungers for pressing the tickets down into the collecting-box, substantially as described.

4. In a machine for cutting cardboard and the like, the combination with the rotary cutters, of two series of guides in rear of said cutters alternating with each other and located in different horizontal planes, and a reciprocating gatherer for feeding the severed strips along said guides, toward a collecting-box, substantially as described.

5. In a machine for cutting cardboard and the like, the combination with the rotary cutters, of guides in rear of the cutters located in different horizontal planes, a reciprocating gatherer provided with a series of hooks for engaging the severed cards on said guides, and means for raising and lowering said hooks into and out of operative position, substantially as described.

6. In a machine for cutting cardboard and the like, the combination with the rotary cutters, of guides in rear of the cutters located in different horizontal planes, a reciprocating gatherer, a collecting-box, a series of plungers for pressing the severed pieces down into said box and means for continually lowering said collecting-box, substantially as described.

7. In a machine for cutting cardboard and the like, the combination with the rotary cutters, of guides in rear of said cutters located in different horizontal planes, a gatherer for feeding the cards along said guides, a collecting-box provided with a series of inclined bottom surfaces and a vertical partition at one end of each of said inclined surfaces, adapted to engage one end of a card and a series of plungers for pressing the cards down into the collecting-box substantially as described.

JOHN MELTON BLACK.

Witnesses:
JOHN E. BOUSFIELD,
C. G. REDFERN.